May 15, 1928.
E. H. McCABE
1,670,040
DRY CELL
Filed Dec. 22, 1924
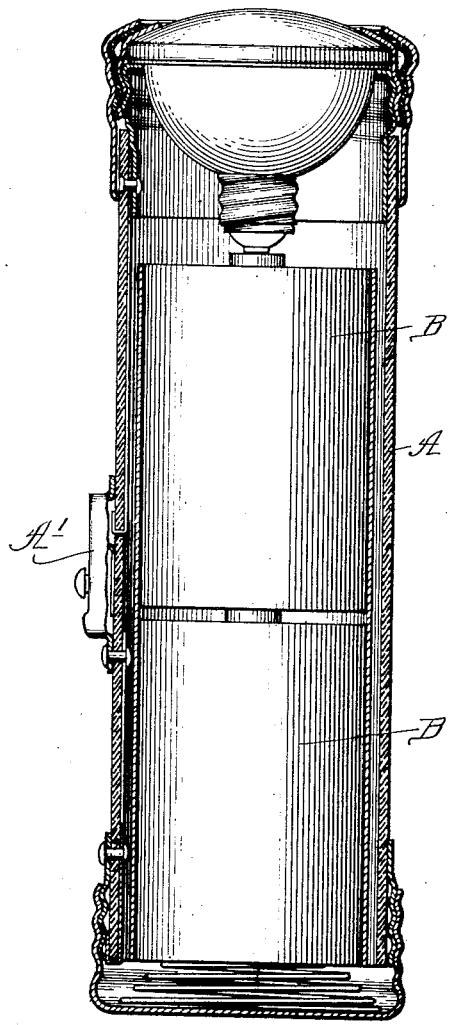
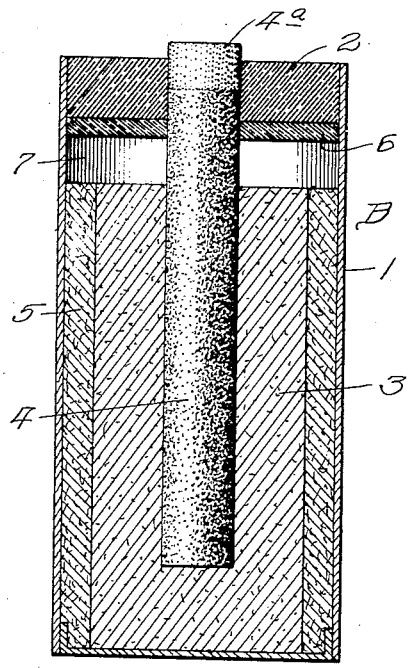
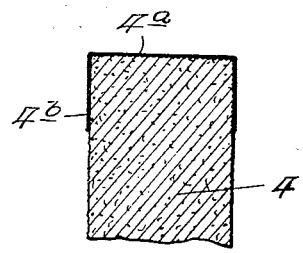
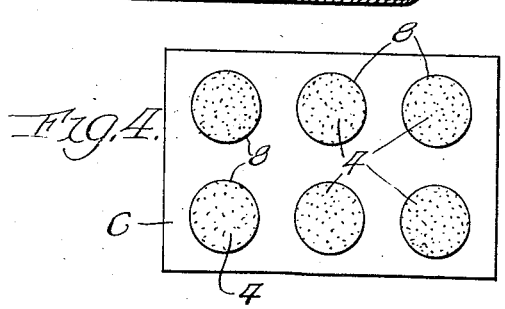
Inventor:
Eugene H. McCabe, Patented May 15, 1928.

1,670,040

UNITED STATES PATENT OFFICE.

EUGENE H. McCABE, OF MADISON, WISCONSIN, ASSIGNOR TO FRENCH BATTERY COMPANY, OF MADISON, WISCONSIN, A CORPORATION OF WISCONSIN.

DRY CELL.

Application filed December 22, 1924. Serial No. 757,403.

The present invention is in the nature of an improvement in dry cells; and the primary object is to provide a dry cell, especially the type employed for use in flashlights, in which the metallic cap ordinarily employed on the carbon electrode is omitted, and a metallic end-facing for the carbon is supplied in accordance with the method herein described.

The invention is illustrated in the accompanying drawing, in which—

Figure 1 represents a sectional view of a flashlight containing two cells constructed in accordance with the invention; Fig. 2, a sectional view of one of the cells shown in Fig. 1; Fig. 3, a broken sectional view of the upper end portion of the carbon electrode; and Fig. 4, a view illustrating the manner in which carbons may be suitably tipped with metallic coatings, in accordance with the present method.

Referring to Figs. 1 and 2, A represents a flashlight casing equipped with a circuit-closing device A', and B, dry cells adapted for use in said flash-light.

In the construction illustrated, each dry cell comprises a zinc container, 1, having its upper end closed by a suitable sealing compound 2; a compacted core 3 of depolarizing mixture usually comprising manganese dioxid and carbonaceous material; a carbon electrode 4 embedded in the core 3, and having its upper end extending through the seal 2; electrolyte 5 filling the space between the core and the container; and a pasteboard washer 6 disposed beneath the sealing compound and separated from the core and electrolyte by an air space 7.

In accordance with the present method, the upper end surface of the carbon electrode is coated with a metallic powder, as indicated at $4^a$; and, if desired, this coating may be reflected over the upper circumferential portion of the carbon, as indicated at $4^b$. The metallic powder should be so applied as to force particles thereof into the pores of the carbon and build up a metallic surface, which may, however, constitute only a thin film above the surface of the carbon. Accordingly, the metallic powder is sprayed, or forced, against the surface of the carbon at short range and under comparatively high pressure. Pressure employed for the purpose may be pneumatic pressure.

It is preferred to use a coating composed of very fine particles of copper, or brass. The coating may be applied, for example, by means of a nozzle having a central passage through which a copper wire is fed, an annular passage through which oxygen and hydrogen are supplied to feed an oxy-hydrogen flame for melting the point of the copper wire, and an outer annular channel through which an air blast is supplied for carrying the particles of metal, as they are freed from the wire against the surface of the carbon. Such device will operate somewhat as a blowtorch, and will effect the melting and disintegration of the end portion of the wire and will carry the particles of metal, with great force, against the carbon. By this method, the particles of metal are forced into the pores of the carbon, and a metal film is built upon the end surface of the carbon and firmly anchored in the carbon. Suitable pressure for the spraying of oxygen and hydrogen to the frame is about thirty pounds per square inch; and suitable pressure for the compressed air employed for blowing the metal particles against the carbon is about one hundred pounds per square inch. A lower pressure will suffice, however. The end of the nozzle may be placed a few inches from the carbon to be coated.

As has been indicated, the particles of metal are first driven into the pores of the carbon, and finally the entire surface of the carbon becomes coated. Sufficient fusing of the particles occurs, apparently, because of the heat of collision, to cause the particles to coalesce, or become united, and form a film which completely covers the end surface of the carbon. The metallic surface thus produced on the carbon is a fine, granular surface, and affords an excellent electrical contact.

While in the illustration given, the coating is shown as carried down over the circumferential surface of the carbon for a short distance, in practice this is unnecessary. In fact, if desired, the metallic surface, or film, may be applied only to a restricted area on the central portion of the end surface of the carbon. In other words, it need not extend outwardly from the central point wholly to the circumference of the end surface. A certain advantage can be obtained by thus restricting the coated area, inasmuch as by this method, a sufficient area of contact for the purpose of the electric circuit can be obtained without covering the whole end surface of the carbon. Where the restricted area of coating is employed, there is less liability that corrosion of the metal will occur in the use of the cell. Where, for example, a brass cap is employed on the carbon, there is danger that some electrolyte may escape past the seal and attack the brass cap, thereby forming a scale of metal oxid and electrolyte, which is reflected across, or partially across, the upper surface of the pitch seal. The scale has a tendency to creep across the brass cap, thereby greatly injuring the contact. The tendency is to cause leakage, or a partial short circuit from the upper end of the carbon electrode to the zinc can. Thus, not only is the efficiency of the cell lowered and its life shortened, but the contact is injured, or rendered less conductive, so that the best results are not obtained with flash-lights employing such construction. Where, in accordance with the present invention the area of metallic contact is limited wholly to the end surface of the carbon, or is confined to the central portion of the end surface of the carbon so as to present only a film like disk of small diameter, there is less likelihood of the electrolyte reaching the metal and causing the injury from corrosion which has been mentioned.

Referring to Fig. 4, C represents a shield which may be of metal, cardboard, or any suitable material. This shield is provided with perforations 8 which receive, or to which are presented, the ends of the carbons 4. The shield may be of any desired size and may accommodate as many carbons as desired. It may serve as a holder for the carbons, or any suitable holder may be provided. By the use of such a device, the end surfaces of a batch of carbons may be presented to the torch, or gun, and the spraying of the end surfaces may be quickly and cheaply effected.

Any other suitable method of driving fine particles of metal, at high speed, against the end surface of the carbon may be employed, the object being, first, to embed particles in the pores of the carbon, and then cause coalescence of the particles as the spraying operation proceeds, so that a fine, granular film on the end surface of the carbon results which is well anchored to the carbon. The film may be burnished, or polished, if desired, but ordinarily, this will be unnecessary. Any suitable metal may be employed instead of copper or brass. The metals most resistant to corrosion, such as copper, brass, zinc, etc., are preferred, however.

The foregoing detailed description has been given for clearness of understanding only, and no unnecessary limitations should be understood therefrom, but the appended claim should be construed as broadly as permissible, in view of the prior art.

What I regard as new, and desire to secure by Letters Patent, is:

The method of applying a metal film to the end-portion of a carbon pole which comprises melting the point of a metal wire and forcing the particles of metal as they are freed from the wire against the surface of the carbon by means of an air-blast which serves to embed the metal particles in the pores of the carbon and then build up a metal film thereon.

EUGENE H. McCABE.